United States Patent
Stolze

(10) Patent No.: US 7,475,113 B2
(45) Date of Patent: Jan. 6, 2009

(54) METHOD FOR AUTOMATICALLY COMPLETING AN INCOMPLETE ADDRESS ENTRY

(75) Inventor: Markus Stolze, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 10/730,774

(22) Filed: Dec. 9, 2003

(65) Prior Publication Data
US 2004/0153519 A1 Aug. 5, 2004

(30) Foreign Application Priority Data
Dec. 12, 2002 (EP) ................................. 02406092

(51) Int. Cl.
G06F 15/16 (2006.01)
G06F 15/173 (2006.01)
G06F 15/177 (2006.01)
(52) U.S. Cl. ........................... 709/206; 709/200; 707/6; 370/353; 713/193
(58) Field of Classification Search ......... 709/200–206, 709/217–224
See application file for complete search history.

(56) References Cited

U.S. PATENT DOCUMENTS

| 6,829,607 | B1 * | 12/2004 | Tafoya et al. ................... 707/6 |
| 6,895,426 | B1 * | 5/2005 | Cortright et al. ............ 709/206 |
| 2002/0057678 | A1 * | 5/2002 | Jiang et al. ................... 370/353 |
| 2003/0028792 | A1 * | 2/2003 | Plow et al. ................... 713/193 |

* cited by examiner

Primary Examiner—Haresh N Patel
(74) Attorney, Agent, or Firm—Scully, Scott, Murphy & Presser, P.C.; Lisa M. Yamonaco

(57) ABSTRACT

A method for completing an address, e.g., a mail address, an e-mail address, or a phone number. For that the method comprises the steps of detecting an incomplete user input of the address, deriving a completion offer to the incomplete user input in dependence on a derivable score, and offering the derived completion offer for completing the address. This allows to design more effective support systems, which help the user to find more quickly addresses that have not been entered in full. The derivable score approximates the probability of the address to be the one intended by a user. The derivable score can be influenced by several factors which can be given but as well as can be chosen or influenced by the user.

8 Claims, 4 Drawing Sheets

METHOD FOR AUTOMATICALLY COMPLETING AN INCOMPLETE ADDRESS ENTRY

TECHNICAL FIELD

The present invention is related to a method and apparatus for completing an address. Particularly, the invention is related to complete a mail address, an e-mail address, or a phone number, or any other recipient identifier.

BACKGROUND OF THE INVENTION

Users of electronic devices often have to insert an address that is an electronic address, also referred to as e-mail address, a phone number, or any other address to identify a recipient, person or object. For that the users have to remember the detailed address for those people for which they did not create an entry in their electronic address book, but still might communicate to quite frequently. Some known e-mail clients, for example, offer a complementation or completion of the address which was entered partly. However, even if the user is connected to a remote address book, or has entered a large enough number of address records in the address book, e-mail address completions often proposes a "wrong" e-mail address supplement. The reason for this is that today's e-mail clients do an alphabetical sequential search of the address book for matching records. Despite the fact that the user might send quite often mail to "Steven Anderson", the fact that there is also an "Andy Anderson" in the address book does mean that when typing "Anderson" in the e-mail client and waiting for the address completion this will result in "Andy Anderson" being displayed. The same applies to other kinds of addresses, e.g. mail addresses, phone numbers, etceteras.

The e-mail client Endora (Eudora is a registered trademark of QUALCOMM Incorporated) provides a mechanism called "Automatic Name Completion" which is described in the user manual http://www.eudora.com/download/eudora/windows/5.2/Manual.zip on pages 32 to 34. When completing a name or e-mail address in the field such as the "To" field, Eudora not only displays entries from the users address book, but it also searches for matches in a so-called "history file" and displays entries found in there. The Eudora history file consists of names and e-mail addresses of people the user previously sent messages to within Eudora. While to a lesser degree, the same drawbacks as mentioned above apply also here.

U.S. Pat. No. 6,405,243 describes a network-based method and system for forwarding an email message to an updated email address. After a user changes his or her email address, the user sends information regarding the updated email address to an address-change server used in conjunction with the present invention. The address-change server stores the updated email information in its database. When a sender wants to reach a recipient whose email address has changed, the sender sends an email message to the address-change server. The address-change server forwards the updated email address to the sender. The sender's email program programmatically forwards the sender's email message to the recipient's new email address.

From the above it follows that there is still a need in the art for an improved mechanism for offering and completing an address when only portions of a name or address have been entered or are available. This shall lead to more user friendly and effective support systems.

SUMMARY OF THE INVENTION

In accordance with the present invention, there is provided methods, apparatus and systems executable in a computer system for generating a completion offer and completing an address. A method comprises the steps of detecting an incomplete user input of the address, deriving the completion offer to the incomplete user input in dependence on a derivable score, and offering the derived completion offer for completing the address.

The presented method provides a completion of an address when only portions or fractions of a name, address, or phone number have been entered or are available. This allows to design more effective support systems, which help the user to find more quickly addresses that have not been entered in full. The provided support by the method is superior to the known prior art because the completion offers are based on the derivable score. This score approximates the probability or likelihood of the address to be the one intended by the user in the current context of the present invention. The derivable score can be influenced by several factors which can be given but as well as can be chosen or influenced by a user.

The completion offer can comprise a list of address completions. The list is ordered in accordance with the derivable score. Moreover, the list of address completions can be presented to the user. Giving the user a list with selectable addresses that has been derived in accordance with the present invention leads to more efficiency as the user finds the desired address more quickly.

In fact, two types of completions can be used. First, an automatic completion if one derived completion offer corresponds to the incomplete user input. Then the address is completed immediately without any user interaction. Second, the list of address completions that has been derived in accordance with the present invention is presented to the user, who then can chose the intended address.

The step of deriving can comprise determining the completion offer based on a score order. This has the advantage that the way how the score order should be applied can be predefined, e.g. the address having the score with the highest value should be used.

When the derivable score is a context dependent address score, then the advantage occurs that the probability is high that an address fragment is completed with the right address.

The step of deriving can comprise defining at least one possible address based on the incomplete user input or prior user interactions. This will allow to identify potential address to be offered.

Moreover, the step of deriving can further comprise assigning one context dependent address score to the or each possible address, and including the or each possible address in the completion offer in dependence on the or each assigned context dependent address score.

A base score can be derived from the content of one or more of a user organizational context record, a user address book, an incoming mail record, an outgoing mail record, an address record, and many other data. As the derivable score bases on the base score, the influence of the base score can be determined and individually set.

The context dependent address score can be derived from the base score and from one or more of a user typed address fragment, recently opened addresses, addresses used in recent communication, and recent completion corrections. Several factors or combinations thereof can be used to influence the derivable score. This shows the flexibility of the proposed method and leads to widely applicable scenarios.

The base score can decrease over time and thereby influences the derivable score. This supports to adapt or react to changes in the user's behavior of address use. For example, when the user stops sending or using e-mails to a person to whom he sent multiple e-mails before, this will result in a reduction over time of the base score for the address of this person. In other words the mechanism of the address completion takes into account also a time factor for the derivation of the a completion offer.

The address referred to herein can be a mail address, an e-mail address, or a phone number. This shows that the proposed method is widely applicable and can be used in text processing systems, e-mail clients, and mobile phones or personal digital assistants (PDAs).

DESCRIPTION OF THE DRAWINGS

Example embodiments of the invention are described in detail below, by way of example only, with reference to the following figures.

Figure 1:
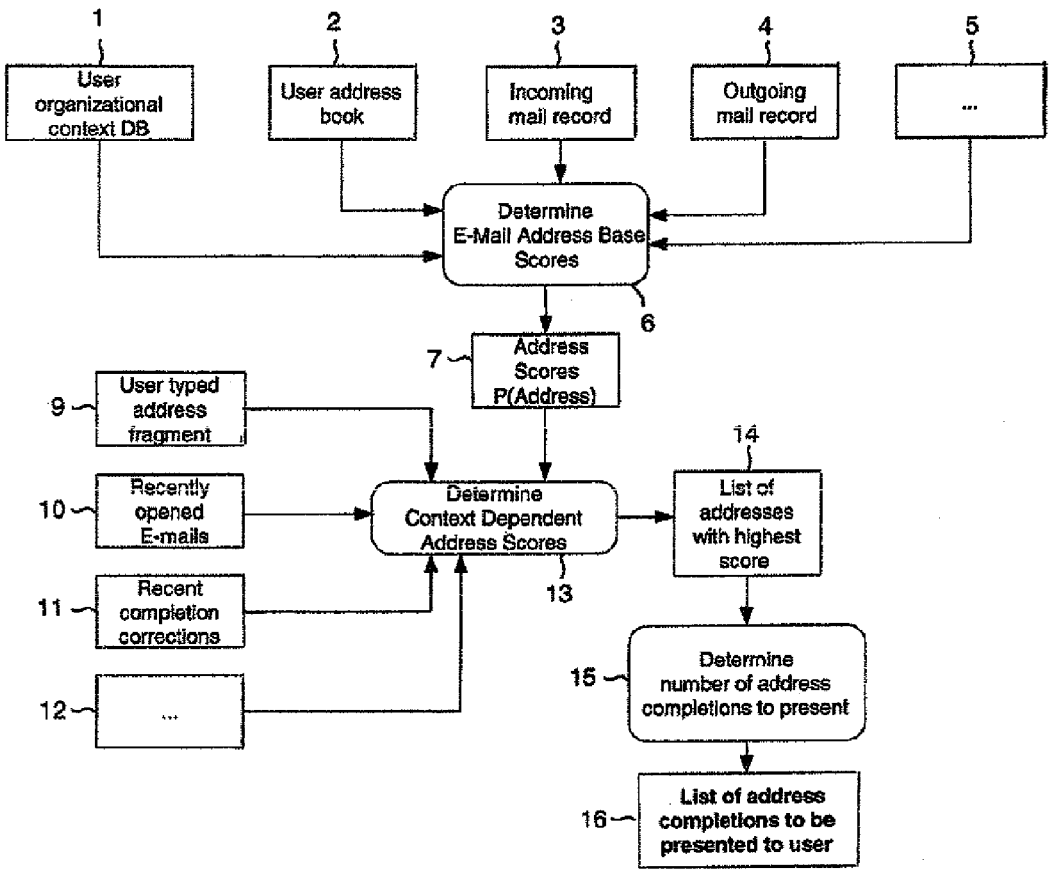
FIG. 1 shows a schematic illustration of a data-flow diagram for context dependent address completion.

The drawings are provided for illustrative purposes only.

DESCRIPTION OF THE INVENTION

The present invention provides methods, apparatus and systems executable in a computer system for generating a completion offer and completing an address. In an example embodiment, a method comprises the steps of detecting an incomplete user input of the address, deriving the completion offer to the incomplete user input in dependence on a derivable score, and offering the derived completion offer for completing the address.

The presented invention provides a completion of an address when only portions or fractions of a name, address, or phone number have been entered or are available. This allows to design more effective support systems, which help the user to find more quickly addresses that have not been entered in full. The provided support by the method is superior to the known prior art because the completion offers are based on the derivable score. This score approximates the probability or likelihood of the address to be the one intended by the user in the current context of the present invention. The derivable score can be influenced by several factors which can be given but as well as can be chosen or influenced by a user.

The completion offer can comprise a list of address completions. The list is ordered in accordance with the derivable score. Moreover, the list of address completions can be presented to the user. Giving the user a list with selectable addresses that has been derived in accordance with the present invention leads to more efficiency as the user finds the desired address more quickly.

In fact, two types of completions can be used. First, an automatic completion if one derived completion offer corresponds to the incomplete user input. Then the address is completed immediately without any user interaction. Second, the list of address completions that has been derived in accordance with the present invention is presented to the user, who then can chose the intended address.

The step of deriving can comprise determining the completion offer based on a score order. This has the advantage that the way how the score order should be applied can be predefined, e.g. the address having the score with the highest value should be used.

When the derivable score is a context dependent address score, then the advantage occurs that the probability is high that an address fragment is completed with the right address.

The step of deriving can comprise defining at least one possible address based on the incomplete user input or prior user interactions. This will allow to identify potential address to be offered.

Moreover, the step of deriving can further comprise assigning one context dependent address score to the or each possible address, and including the or each possible address in the completion offer in dependence on the or each assigned context dependent address score.

A base score can be derived from the content of one or more of a user organizational context record, a user address book, an incoming mail record, an outgoing mail record, an address record, and many other data. As the derivable score bases on the base score, the influence of the base score can be determined and individually set.

The context dependent address score can be derived from the base score and from one or more of a user typed address fragment, recently opened addresses, addresses used in recent communication, and recent completion corrections. Several factors or combinations thereof can be used to influence the derivable score. This shows the flexibility of the proposed method and leads to widely applicable scenarios.

The base score can decrease over time and thereby influences the derivable score. This supports to adapt or react to changes in the user's behavior of address use. For example, when the user stops sending or using e-mails to a person to whom he sent multiple e-mails before, this will result in a reduction over time of the base score for the address of this person. In other words the mechanism of the address completion takes into account also a time factor for the derivation of the a completion offer.

The address referred to herein can be a mail address, an e-mail address, or a phone number. This shows that the proposed method is widely applicable and can be used in text processing systems, e-mail clients, and mobile phones or personal digital assistants (PDAs).

In accordance with another aspect of the present invention, there is provided an apparatus for generating a completion offer and completing an address. The apparatus comprises a logic configured to detect an incomplete user input of the address, a logic configured to derive the completion offer to the incomplete user input in dependence on a derivable score, and a logic configured to offer the derived completion offer for completing the address.

Although the present invention is applicable to different address and recipient identifiers the focus is put on an e-mail address completion as this is widely desired. At first a general description is given before some details in accordance with the present invention are described with reference to the figures.

In general, after each sending or receiving of an e-mail a derivable score, also interpretable as "importance", of the address records of the involved persons is updated by adding "importance points" to their address records. Mails sent to, received from, CCing, or just mentioning a person will result in different increase or addition of points to the scores. In an preferred embodiment, the importance points can decay over time, e.g. points are reduced by a certain percentage each day. The importance measure, i.e. the derivable score, is then used for e-mail address completion. The list of address records sorted by importance is searched sequentially to find matching records. The user can begin to type the e-mail address, name, or first name into one of the address fields of an e-mail. Once a matching record is found the user's typing is completed automatically. On request by the user, in a second step, a full search of the address book is performed, and a list of all potential matches optionally up to a user specified limited number, from the local address book is presented to the user. The list of potential matches is herein also referred to as list of address completions. If the list did not comprises all entries, the user can request a new list with matching addresses. After a local address book has been searched also searches in other remote sources, such as structured sources, e.g. databases, or unstructured sources, e.g. within the Internet, can be performed.

In a further embodiment some address records, such as important group aliases, support and help services, and addresses of secretaries, are defined to have "general priority". Such records are always displayed first as long as they match the current string in the address field. These records are also displayed if the user requests a "full search" in an empty address field. Records with "general priority" might be copied from a central address book to the users address book when the user's account is set up and they can be updated through a process that is run on behalf of the user in regular intervals and uses e.g. information about the users position in an organization. Users can modify their "general priority" indicators.

If the user wants to find out information about a person, he or she uses the address book and starts searching for the information. The user, also, can just type in an e-mail, a name, or any other information identifying the person into a mail header. On request the full address information can be temporally appended to the mail for reference by the user. The address information will be removed automatically when the mail is sent in accordance with yet another embodiment.

FIG. 1 shows a schematic illustration of a data-flow diagram for context dependent address completion where finally a list of address completions is presented to a user. In particular, it is shown which factors or data can influence the derivable score for automatically completing an address. The boxes labeled with 1 to 5 indicate data sources $d_i$ or records of information which are collected, stored, and updated accordingly. An user organizational context database 1, e.g. how a company is structured, a user address book 2, an incoming mail record 3, and an outgoing mail record 3, and also further data sources as indicated with blank box 5 can be used to influence a base score that is determinable. As indicated with box 6, here an e-mail address base score is determined based on the input data. The determined base score is stored as an address score, also referred to as P(Address), as shown with box 7. Some details how the base score, i.e. P(Address), can be updated is described in the following.

All possible address completions are stored in a list that is updated and sorted by P(address) after each change of the relevant data sources $d_i$. The data sources $d_i$ can be external data sources.

For each data source $d_i$, a specialized algorithm $a_i$ computes a value for $P_i$(address).

A combination function c computes P(address) by combining all $P_{a-di}$(address). When $d_i$ changes, only the corresponding $P_i$(address) is re-computed. The combination function c can then use stored value for the data-sources $d_i$ that have not change.

A simple and easy to communicate combination function is the linear combination function cl, which takes the form P(address)=Sum(w($d_i$)*$P_{a-di}$(address)), with a weight factor w. The advantage of this combination function is, that the user can control manually the weight of the different data sources $d_i$.

Further, the boxes labeled with 9 to 12 indicate a context dependent datastore or records of information which are also collected and updated accordingly. An user typed address fragment record 9, recently opened addresses or e-mails 10, recent completion corrections 12, or addresses used in recent communication, but also further context dependent data sources as indicated with blank box 12 can be used to influence a context dependent address score. The context dependent address score is contemplated as the derivable score. As illustrated with box 13 the context dependent address score is determined from the context dependent records shown in boxes 9 to 12 and the determined base score 7. Some details, how the context dependent address score can be determined, are described in the following.

A search is performed for recent manual completions and/or corrections which match with an address request string or incomplete input. If a match is found, this is used to select a completion offer to an incomplete input.

Another search is performed searching in the context dependent data sources, such as for example addresses contained in recently opened e-mails 10, for matches with the address request string. A full search is performed, whereby any found matches are proposed. If any current e-mail comprises a body text, or at least a subject line, the text similarity measures between the current message and context text fragments can be used to influence the context dependent address score with which the quality of address suggestions is improved.

A sequentially search through a sorted list of possible address completions is performed. When the first two matches are found
 the first match is presented to user,
 the context dependent address score of the first and second match is compared. If the difference in the score is not large enough, then also the second match is present to the user. The minimum difference in the score can be predefined.
 If the second match was presented and not accepted it is continued accordingly with following matches.

For efficiency reasons the context dependent address should be re-computed triggered by user context changes. Moreover, the dependent address score can also be determined in regular time intervals.

As indicated with box 14, the context dependent address score is used to set up and store a list with addresses with the highest score or probability. The number of address completions to be presented to the user can be defined as indicated with box 15. If the number is 1, then it is apparently clear that the completion of a fragmented address runs automatically without any interaction of the user. However, when the number is set to 2 or higher, a list with address completions or completion offers should be presented to the user as indicated with box 16.

Figure 2:
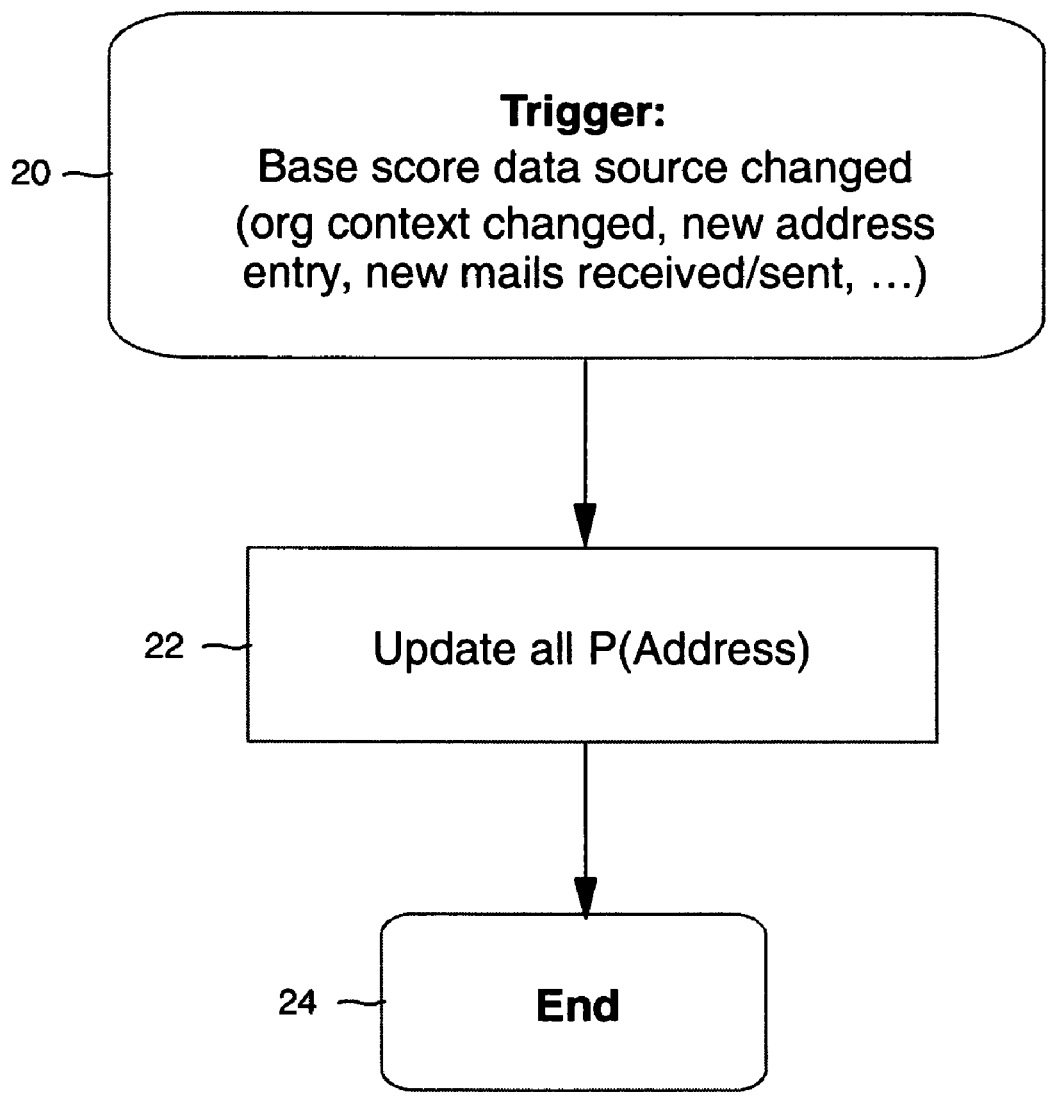
FIG. 2 shows a schematic illustration of a first event diagram for context dependent address completion.

FIG. 2 shows a schematic illustration of a first event diagram for context dependent address completion. As indicated with box 20, an update of the base score can be triggered when a base score data source 1 to 5 changes its content. For example, the organizational context of the user organizational context database 1 can change, a new address entry in the user address book 2 can be made, or new mails are received/sent which is recorded in the incoming mail record 3 and outgoing mail record 3, respectively. If one or more of the latter happen all P(Address) are updated as indicated with box 22. The update is then finished as shown with box 24.

Figure 3:
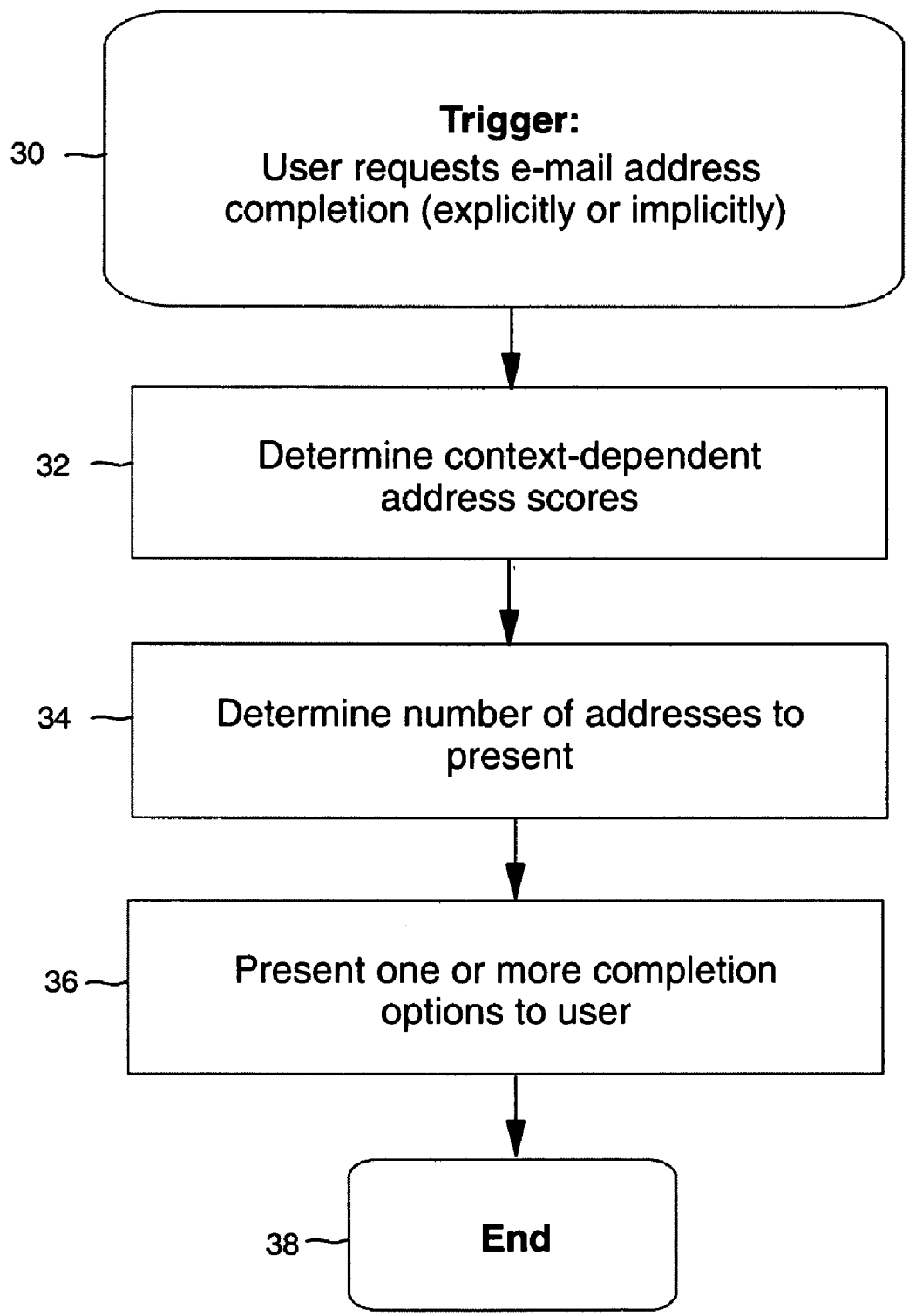
FIG. 3 shows a schematic illustration of a second event diagram for context dependent address completion.

FIG. 3 shows a schematic illustration of a second event diagram for context dependent address completion. As indicated with box 30, the determination of the context dependent address score is triggered by an explicitly or implicitly request of the user for an e-mail address completion. The context dependent address score is then determined as indicated with box 32 and described above. It follows a determination of the number of addresses to be presented as indicated with box 34. As indicated with box 36, one or more completion options, also herein referred to as completion offers, is/are presented to the user. The user can accept or deny. The event diagram ends as shown with box 38.

Figure 4:
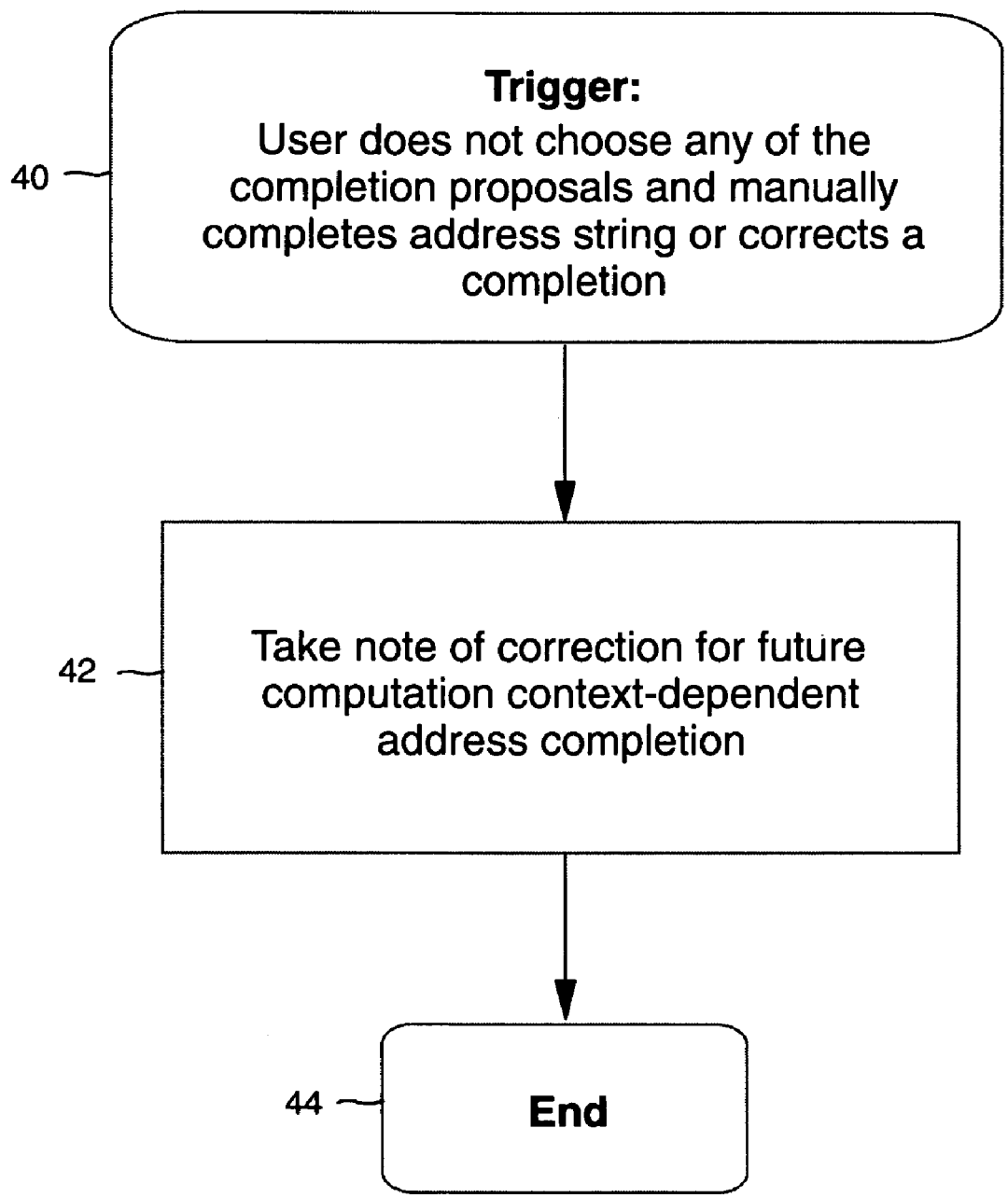
FIG. 4 shows a schematic illustration of a third event diagram for context dependent address completion.

FIG. 4 shows a schematic illustration of a third event diagram for context dependent address completion. The user does not choose any of the completion proposals and manually completes an address string or corrects a completion as indicated with box 40. This triggers the notification of a correction for future computations of context dependent address completion as indicated with box 42. Then, the event diagram ends as indicated with box 44.

Any disclosed embodiment may be combined with one or several of the other embodiments shown and/or described. This is also possible for one or more features of the embodiments.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method executed in a computer system for completing an address, the method comprising the steps of:
   detecting an incomplete input of the address;
   deriving a completion string to said input based on a determined score; and
   offering the derived completion string for completing the address;
   wherein said score is determined as a combination of base score and context dependent address score said base score is updated as a linear combination of the sum of each record changed, multiplied by a number assigned by a user to each such record, which is further multiplied by a base score prior to such change;
   wherein said base score is determined from the content of one or more of: a user's organizational context records, a user's address book, a user's incoming or outgoing mail records, and a user's address records and, wherein the context dependent address score is derived from the base score and from one or more of: a user user address fragments, recently opened addresses, addresses used in recent communications, and recent completion corrections.

2. The method according to claim 1, wherein the completion string comprises a list of address completions, the list is ordered in accordance with the determined score.

3. The method according to claim 2, wherein the step of offering comprises presenting the list of address completions.

4. The method according to claim 1, wherein the determined score is a context dependent address score.

5. The method according to claim 1, wherein the step of deriving comprises defining at least one possible address based on the incomplete user input.

6. The method according to claim 5, wherein the step of deriving further comprises assigning one context dependent address score to each possible address, and including each possible address in the completion string sorted in accordance with the assigned context dependent address score.

7. The method according to claim 1, wherein the base score decreases over time and thereby influences the derivable score.

8. The method according to claim 1, wherein the address is one of a mail address, an e-mail address, or a phone number.

* * * * *